(12) United States Patent
Tachimoto et al.

(10) Patent No.: US 7,980,060 B2
(45) Date of Patent: Jul. 19, 2011

(54) FILTER CLOGGING DETERMINATION APPARATUS FOR DIESEL ENGINE

(75) Inventors: Kazuya Tachimoto, Tokyo (JP); Yasushi Omura, Tokyo (JP); Takashi Moriyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 715 days.

(21) Appl. No.: 12/101,214

(22) Filed: Apr. 11, 2008

(65) Prior Publication Data
US 2009/0038288 A1 Feb. 12, 2009

(30) Foreign Application Priority Data

Apr. 12, 2007 (JP) ................................. 2007-105165

(51) Int. Cl.
*F01N 3/00* (2006.01)
(52) U.S. Cl. .......................................... 60/277; 60/297
(58) Field of Classification Search .................... 60/277, 60/297
See application file for complete search history.

(56) References Cited

U.S. PATENT DOCUMENTS

| | | | | |
|---|---|---|---|---|
| 4,337,745 A | * | 7/1982 | Pomerantz | 123/694 |
| 5,956,940 A | * | 9/1999 | Manaka | 60/274 |
| 6,244,046 B1 | * | 6/2001 | Yamashita | 60/285 |
| 6,453,663 B1 | * | 9/2002 | Orzel et al. | 60/277 |
| 2003/0159433 A1 | * | 8/2003 | Tamura | 60/277 |
| 2005/0262828 A1 | * | 12/2005 | Iihoshi et al. | 60/277 |
| 2006/0101808 A1 | * | 5/2006 | Nakagawa et al. | 60/277 |
| 2007/0137183 A1 | * | 6/2007 | Kawamura et al. | 60/286 |

FOREIGN PATENT DOCUMENTS

| | | |
|---|---|---|
| JP | 2002-021623 | 1/2002 |
| JP | 2003-097333 | 4/2003 |

* cited by examiner

*Primary Examiner* — Thomas E Denion
*Assistant Examiner* — Jason Shanske
(74) *Attorney, Agent, or Firm* — Smith, Gambrell & Russell, LLP

(57) ABSTRACT

A clogging determination apparatus determines clogging of a DPF (Diesel Particulate Filter) such that exhaust pressure is estimated using a sensor deigned for regular control of an engine, without using exhaust pressure sensor. The apparatus includes: the DPF disposed in an exhaust system; an exhaust sensor that measures an air-fuel ratio $\lambda$ in exhaust gas; and an injector that changes the air-fuel ratio in an cylinder through post-injection. A response time T taken for the exhaust sensor to detect a change in the air-fuel ratio is measured from the time when the post-injection is output from the injector. If this response time T is longer than a clogging determination response time To, the apparatus determines that the DPF is clogged.

10 Claims, 6 Drawing Sheets

FILTER CLOGGING DETERMINATION APPARATUS FOR DIESEL ENGINE

CROSS-REFERENCE TO RELATED APPLICATIONS

The disclosure of Japanese Patent Application No. 2007-105165 filed on Apr. 12, 2008 including the specification, drawings and abstract is incorporated herein by reference in its entirety.

BACKGROUND OF THE INVENTION

1. Field of the Invention

The present invention relates to filter clogging determination apparatuses for diesel engines, which determine from the estimation of exhaust pressure the clogging of a diesel particulate filter disposed in an exhaust system.

2. Description of the Related Art

Known diesel engines collect particulate matter (PM) from exhaust gas by passing the exhaust gas through a diesel particulate filter (DPF) disposed in an exhaust passage. PM collected in the DPF accumulates as time elapses. If the amount of collected PM is excessive, the filter will clog, producing resistance in filter passages and hence an increase in exhaust pressure in the diesel engine, ultimately causing a decrease in output. To prevent this, the DPF must be regenerated by, for instance, periodically heating and combusting accumulated PM, thereby removing the PM.

Examples of technology for combusting PM include heating the DPF itself. However, overheating of a DPF may result in early deterioration and a decrease in its durability. To avoid this, the following means for removing PM is generally adopted: separately from the regular injection of fuel, fuel is post-injected into a cylinder during an expansion or exhaust stroke after compression, or fuel is supplied immediately in front of the DPF; thereby increasing the temperature of exhaust gas and oxidizing PM.

To regenerate a DPF, exhaust pressure upstream of the DPF or the difference between exhaust pressures before and after the DPF is measured. When the exhaust pressure upstream of the DPF or the difference between the exhaust pressures becomes equal to or greater than a predetermined value, the DPF is regenerated.

For example, Japanese Patent Application Laid-Open No. 2002-21623 discloses technology in which an exhaust pressure sensor for detecting exhaust pressure is disposed at the entrance of the DPF, and exhaust pressure at the entrance of the DPF is monitored to estimate the amount of PM accumulated in the DPF.

Japanese Patent Application Laid-Open No. 2003-97333 discloses technology in which an exhaust sensor for detecting the oxygen concentration of exhaust gas is disposed upstream of a DPF, and exhaust pressure is estimated from the oxygen concentration detected.

However, the technology disclosed in Japanese Patent Application Laid-Open No. 2002-21623 requires an exhaust pressure sensor to be specially installed upstream of the DPF, with the result that the number of components and hence the manufacturing costs increase. Similarly, where a difference between the pressures before and after the DPF is used to estimate an amount of accumulated PM, a pressure difference sensor is required, which also increases the number of components and the manufacturing costs.

The technology disclosed in Japanese Patent Application Laid-Open No. 2003-97333 estimates the amount of accumulated PM from the output voltage of an exhaust sensor. This makes it difficult to determine whether a change in output voltage results from a change in the oxygen concentration of the exhaust gas or from an increase in exhaust pressure.

Further, in the technology disclosed in Japanese Patent Application Laid-Open No. 2003-97333, the target output with which the output voltage of the exhaust sensor is to be compared must be stored in the form of a map for each operating state. Accordingly, an enormous amount of data must be stored in a storage means.

This requires a tremendous amount of time and cost to collect data through experiments and simulations. Furthermore, the capacity of the storage means must be large enough to store the enormous amount of data. This leads to higher manufacturing costs.

SUMMARY OF THE INVENTION

The present invention has been proposed in view of the drawbacks described above. It is therefore an object of the present invention to provide a filter clogging determination apparatus for a diesel engine, the apparatus being capable of determining clogging of a diesel particulate filter such that exhaust pressure is estimated from the value of the output of a sensor used for regular control of an engine, without using a separate exhaust pressure sensor, a pressure difference sensor, or an enormous amount of map data and, accordingly, without involving corresponding increases in the number of components and manufacturing costs.

In order to achieve the object, there is provided a filter clogging determination apparatus for a diesel engine having a diesel particulate filter in an exhaust system, the apparatus comprising: an exhaust sensor disposed in the exhaust system and used to detect at least an air-fuel ratio or oxygen concentration in exhaust gas; an air-fuel ratio changing means for changing the air-fuel ratio; a response time calculating means for calculating a response time taken for the exhaust sensor to detect an air-fuel ratio change after the air-fuel is changed; and a clogging determination means for determining clogging of the diesel particulate filter by comparing the response time and a clogging determination response time.

In the present invention, if air-fuel ratio changes, clogging of a diesel particulate filter is determined based on the time taken for an exhaust sensor to detect this air-fuel ratio change. This makes it possible to estimate exhaust pressure by use of an exhaust sensor used for regular control of the engine. This obviates the necessity for an exhaust pressure sensor, a pressure difference sensor or an enormous amount of map data, and avoids increasing the number of components and hence manufacturing costs.

DETAILED DESCRIPTION OF THE PREFERRED EMBODIMENTS

Embodiments according to the present invention will hereinafter be described with reference to the accompanying drawings.

First Embodiment

Figure 1:
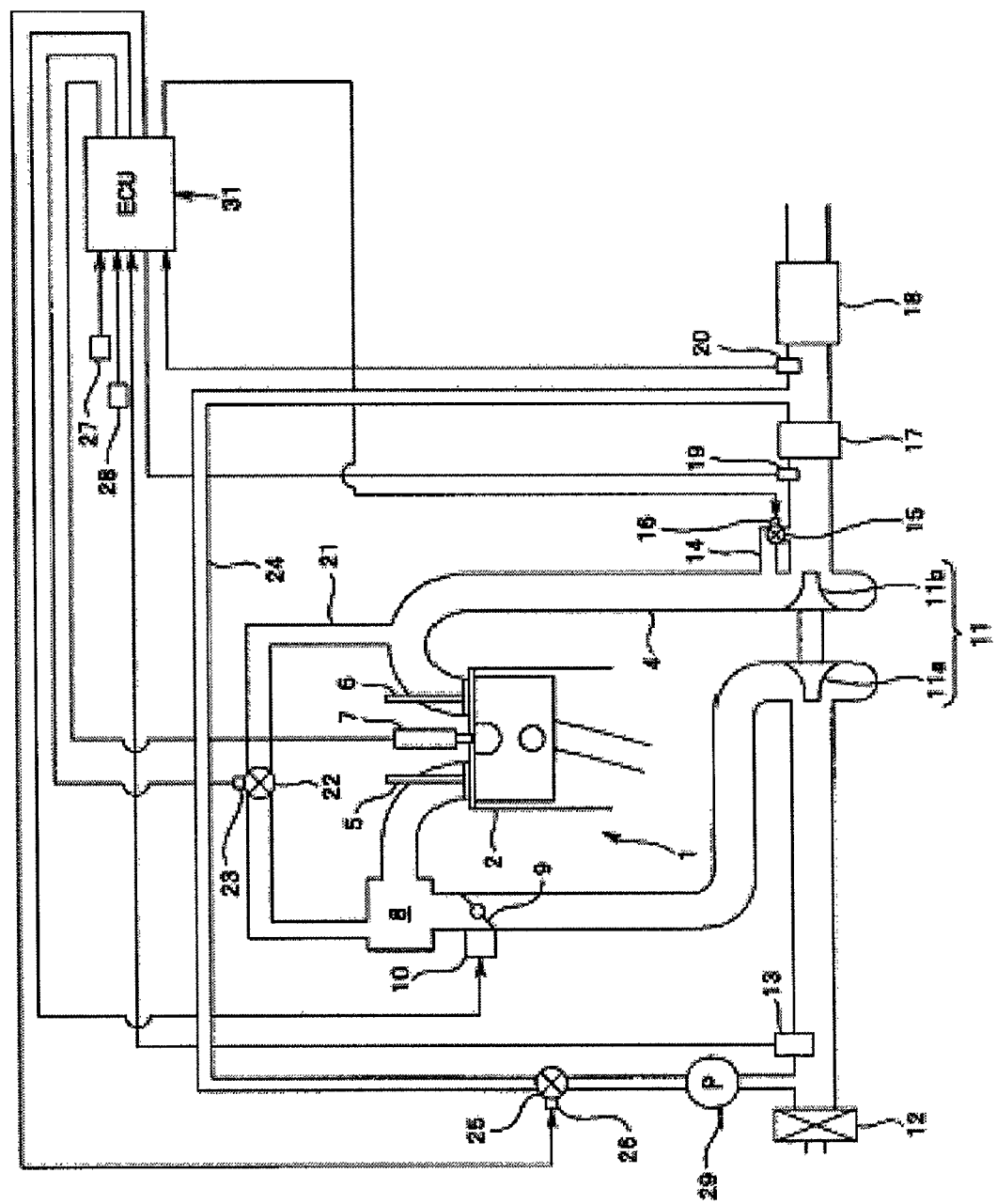
FIG. 1 is a schematic view of the configuration of a diesel engine according to a first embodiment of the present invention.

FIGS. 1 to 4 show the first embodiment. FIG. 1 is a schematic view of the configuration of a diesel engine.

Reference numeral 1 in FIG. 1 represents a diesel engine. The engine 1 is provided with a plurality of cylinders 2. An intake passage 3 composing an intake system and an exhaust passage 4 composing an exhaust system communicate with each cylinder 2. An intake valve 5 and an exhaust valve 6, which may be freely opened or closed, are disposed in the passage 3 and passage 4 ports respectively exposed to a combustion chamber. Further, an injector 7 faces each cylinder 2.

The intake passages 3 communicating with the corresponding cylinders 2 are gathered together in an air chamber 8 disposed upstream of the cylinders 2, and extend upstream. Disposed in the intake passages 3 and upstream of the air chamber 8 is an intake throttle valve 9 serving as an intake adjusting means. The intake throttle valve 9 is connected to an intake throttle actuator 10 so as to be continuously or gradually operated from a fully opened state to a fully closed state, thereby adjusting the amount of intake air passing through the intake passage 3, the intake throttle actuator 10 being operated in response to a drive signal transmitted from an electronic control unit (ECU) 31 (described below).

Disposed in the intake passages 3 and upstream of the intake throttle 9 is a compressor 11a for a turbo-supercharger 11. Further, an air cleaner 12 is disposed in the intake passage 3 and upstream of the compressor 11a. Downstream of the air cleaner 12 is an intake air amount sensor 13, which detects the mass flow rate of passing air (i.e., the amount of intake air) Q.

On the other hand, the exhaust passages 4 extending from the engine 1 are gathered together at a certain point along their lengths and extend downstream, at which point in the exhaust passages 4 a turbine 11b for the turbo-supercharger 11 is disposed. The exhaust passages 4 are provided with an exhaust bypass passage 14 that by passes the turbine 11b. Disposed in the exhaust bypass passage 14 is a waist gate valve 15 serving as a charging pressure adjusting means that controls exhaust pressure supplied to the turbine 11b. The waist gate valve 15 is connected to a waist gate actuator 16 operated in response to a drive signal supplied from an ECU 31 (described below).

Disposed in the exhaust passages 4 and downstream of the turbine 11b are a diesel oxidation catalyst (DOC) 17 and a diesel particulate filter (DPF) 18. Further, disposed upstream of the DOC 17 is an exhaust temperature sensor 19, which detects exhaust temperature TEX. Immediately upstream of the DPF 18 is an exhaust sensor 20, which detects either an air-fuel ratio λ or oxygen concentration O2 in exhaust gas. The air-fuel ratio refers to an excess air ratio (theoretically, λ=1). For convenience, the description below exemplifies the case where the exhaust sensor 20 detects an air-fuel ratio λ.

Since an air-fuel ratio λ is obtained from the excess air ratio of exhaust gas, the air-fuel ratio λ changes with the amount of fuel injected or the amount of secondary air supplied. Accordingly, in the first embodiment, the air-fuel ratio is changed by the amount of fuel injected from the injector 7 or of the secondary air emitted from a secondary air supply passage 24 (described later).

The DOC 17 is formed by holding a noble metal (e.g., platinum or palladium) or a metallic oxide (e.g., alumina) to the surface of a ceramic carrier formed of, for example, a cordierite honeycomb structure. The DOC 17 oxidizes or gasifies hydrocarbons (HC) in exhaust gas by a catalytic reaction, thereby decreasing particulate matter (PM) in the exhaust gas.

The DPF 18 is a filter for collecting PM. By forming heat-resistance ceramics, such as cordierite, into a honeycomb structure and then alternately sealing the entrances and exits of a large number of cells serving as gas passages, the DPF 18 is formed. When flowing in the DPF 18, exhaust gas passes through the porous walls of the DPF 18 and flows downstream, during which PM in the exhaust gas is collected and gradually accumulates.

An example of a regeneration process, in which PM accumulating in the DPF 18 is removed, includes the process of combusting PM by post-injection. Specifically, uncombusted HC is deliberately discharged by post-injection, and then subjected to an oxidative reaction caused by the DOC 17. Heat produced as a result of the oxidative reaction heats the DPF 18, thereby increasing the temperature of the DPF 18. This heat burns the PM collected by the DPF 18 and thus the DPF 18 is regenerated.

A part of the exhaust passages 4, which is upstream of the turbine 11b, communicates with the air chamber 8 via an exhaust re-circulation (EGR) passage 21. An EGR valve 22 functioning as an exhaust re-circulating means is disposed at a certain point in the EGR passage 21. This EGR valve 22 is connected to an EGR actuator 23 operated by a drive signal from the ECU 31 (described below). The EGR valve 22 adjusts the flow rate of exhaust gas re-circulating to the intake system, such that when the EGR valve 22 is opened, some of the exhaust gas (EGR gas) is re-circulated into the air chamber 8 and re-combusted.

A part of the intake passage 3, which is upstream of the intake air amount sensor 13, and a part of the exhaust passage 4, which is between the DOC 17 and DPF 18, communicate with each other via a secondary air supply passage 24. Disposed in the secondary air supply passage 24 is a secondary air valve 25, upstream of which is an air pump 29. Connected to the secondary air valve 25 is a secondary air actuator 26, which opens or closes the secondary air valve 25 in response to a drive signal from the ECU 31 (described below). When the secondary air valve 25 opens, air sucked by the air pump 29 passes through the secondary air supply passage 24, and is then supplied to the DPF 18 and used to regenerate the DPF 18.

The electronic control unit (ECU) 31 comprises, as its main component, a well-known microcomputer, which includes a CPU, ROM, RAM, etc. In addition to the intake air amount sensor 13, the exhaust temperature sensor 19, and the exhaust sensor 20, other sensors, such as an engine speed sensor 27 and accelerator opening degree sensor 28, and switches are connected to the input side of the electronic control unit 31 in order to detect the engine's operating state. The engine speed sensor 27 serving as an engine speed measuring means measures the engine speed Ne from the number of revolutions of, for example, a crank shaft (not shown). The accelerator opening degree sensor 28 detects the degree to which an accelerator pedal has been opened (i.e., the degree of depression) θacc. Connected to the output side of the ECU 31 are the aforesaid actuators 7, 10, 16, 23, and 26.

Based on parameters detected by the various sensors and switches and representing the engine's operating state, the ECU 31 sets the amount of fuel and the timing for an injection, following a control program stored in the ROM. The ECU 31 also determines whether the DPF 18 is clogged or not, and if the determination is made that the DPF 18 is clogged or is very likely to be so in near future, the ECU 31 regenerates the DPF 18.

In the second embodiment, the ECU 31 measures the time (i.e., response time) taken for the exhaust sensor 20 of the exhaust system to detect a change in the air-fuel ratio after the air-fuel ratio is changed by changing an amount of fuel injected to be supplied to a specific cylinder 2. If the response time is long, the ECU 31 estimates that the exhaust pressure has risen due to the clogging of the DPF 18 and regenerates the DPF 18.

A clogging determination process for the DPF 18, which is performed by the ECU 31, will now be described with reference to the clogging determination routine shown in FIGS. 2 and 3. This routine takes place for every crank angle corresponding to a cylinder that reaches dead center after the ignition switch is turned on.

First, in step 1, an integrated value Ds obtained until the current time since the previous regeneration process is compared with a predetermined integrated value Dso used to determine clogging. The DPF 18 is not clogged frequently but becomes so at a relatively long interval. Accordingly, the integrated value Ds of a physical amount having a causal relationship with the accumulation of PM is calculated. Using the integrated value Ds for the physical amount and an integrated value at which clogging actually arises, an integrated value before the occurrence of clogging is obtained through an experiment or the like and is set as a clogging determination interval Dso. The physical amount having the causal relationship with the accumulation of PM, obtained until the current time since the regeneration process, may be a running distance, an integrated period during which the engine has been operated, an integrated amount for fuel injected, an integrated amount for intake air, or the like.

If Ds<Dso in step S1, the ECU 31 determines that it is unnecessary to continue the clogging determination process and ends this routine. If Ds≧Dso, the ECU 13 determines that the clogging determination process is required and proceeds to steps S2, S3, and S4 to determine conditions for initiating a clogging diagnosis.

Specifically, in step 2, the ECU 31 reads the engine speed Ne measured by the engine speed sensor 27 and compares this engine speed Ne and an engine speed Neo used to determine whether to initiate the clogging diagnosis. If the engine speed Ne is high, the exhaust flow rate increases. This results in a small difference between the response time detected when clogging has occurred and the response time detected when clogging has not occurred, and accordingly degrades diagnosis accuracy. The engine speed Neo that determines the initiation of a clogging diagnosis equals the upper limit of the engine speed Ne, at which there is a large difference between the response time detected when clogging has occurred and the response time detected when it has not. This engine speed Neo is obtained through an experiment or the like.

If Ne>Neo, conditions for initiating the diagnosis are not satisfied and, accordingly, the ECU 31 ends this routine. If Ne≦Neo, the flow proceeds to step S3.

In step S3, based on a signal from a shift position sensor (not shown) that detects the shift position of a transmission or (in the case of a vehicle incorporating a manual transmission) the shift position from a clutch switch (not shown), the ECU 31 checks whether the transmission shift has been set in a neutral position or not or whether the clutch has been disconnected or not. If the transmission is in neutral or the clutch is disconnected, the process proceeds to step S4. If the transmission is not in neutral or the clutch is connected, conditions for initiating clogging diagnosis are not satisfied, and the ECU 31 ends the routine.

In the first embodiment, as described below, clogging of the DPF 18 is determined based on the response time T taken for the exhaust sensor 20 in the exhaust system to detect an air-fuel ratio change in the intake system. Accordingly, if the air-fuel ratio increases (for instance), engine torque increases and consequently vehicle behavior changes. If the air-fuel ratio is made "leaner" by cutting fuel, on the other hand, engine torque decreases and also vehicle behavior will change. Clogging diagnosis according to the first embodiment may easily lead to change in vehicle behavior. Accordingly, clogging diagnosis must be made under conditions where vehicle behavior change will not affect vehicle operation. Where the transmission has been set to neutral or the clutch has been disconnected, clogging diagnosis can be applied in an area where engine torque change does not affect the vehicle behavior.

In the case of a vehicle incorporating an automatic transmission, the ECU 31 may check in step S3 whether the shift position has been set to a parking position or not. If YES, the flow proceeds to step S4.

In step S4, the ECU 31 checks whether the cylinder that reaches a compression dead center is a specific cylinder #S selected in advance. Where the distances from the exhaust ports of cylinders 2 to exhaust sensors 20 may differ greatly in a multi-cylinder engine, response times also differ. In the first embodiment, the cylinder where the distance from its exhaust port to the exhaust sensor 20 is greatest is assigned as the specific cylinder #S so as to ensure a distinct response time difference.

If the cylinder 2 that reaches the compression dead center is not specific cylinder #S, the ECU 31 ends the routine, but if the cylinder 2 that reaches the compression dead center is specific cylinder #S, the flow proceeds to step S5.

If all the conditions for initiating clogging diagnosis are satisfied in steps S2 to S4, the flow proceeds to steps S5 to S7, where quantitative control for stable clogging diagnosis is exerted.

First, in step S5, the ECU 31 exerts control such that the amount Q of intake air becomes constant, by driving the intake throttle actuator 10 and fixing the degree of opening of the intake throttle valve 9 to a preset degree of opening. In other words, keeping the amount of intake air substantially constant makes it possible to stably measure the response time T at any time. Accordingly, fixing the degree of opening of the intake throttle valve 9 ensures the substantially constant amount of intake air required for clogging diagnosis. In this case, once the amount Q of intake air detected by the intake amount sensor 13 has been measured, the degree of opening of the intake throttle valve 9 may be controlled by feedback so that the amount Q of intake air matches a preset target.

Next, the flow proceeds to step S6, where control is exerted to keep the supercharged pressure Pt of a turbo-supercharger 11 constant by driving a waist gate actuator 16 and then fixing the waist gate valve 15 to a preset degree of opening. Making the supercharged pressure Pt substantially constant ensures stable measurement of the response time T. In this case, after estimation of the supercharged pressure Pt from the amount Q of intake air, the waist gate valve 15 may be feedback-controlled to keep the supercharged pressure Pt constant.

Thereafter, the flow proceeds to step S7, where control is exerted to keep an EGR rate constant by driving the EGR actuator 23 and then fixing the EGR valve 22 to a preset degree of opening. Keeping the EGR rate substantially constant ensures stable measurement of the response time T.

Subsequently, the flow proceeds to step 8 to perform an air-fuel ratio changing process, which functions as an air-fuel ratio changing means. In the air-fuel ratio changing process, learning control and air-fuel ratio feedback control using the exhaust sensor 20 are first suspended, thereby preventing erroneous air-fuel ratio feedback correction and erroneous learning. Thereafter, the amount of fuel to be injected is increased through post-injection in which engine torque is not substantially affected because fuel is additionally injected after the main injection or through minute injection in which fuel is injected when an air-fuel ratio is extremely lean as during fuel cuts. Injection in such an operating state secures a rich air-fuel ratio even if the amount of fuel injected is very small.

In this case, by adjusting the amount of secondary air to be supplied, an air-fuel ratio can be relatively changed, in which case the secondary air valve 25 is fully closed from the opened position, thereby stopping the supply of secondary air and thus making the air-fuel ratio relatively rich. In this case, after the air-fuel ratio is made leaner by opening the secondary air valve 25, thereby increasing the amount of secondary air to be supplied, an air-fuel ratio change can be detected. However, a diesel engine is run at a lean air-fuel ratio, which makes it difficult to accurately detect an air-fuel ratio change. For this reason, in the first embodiment, an operation is performed so as to make the air-fuel ratio rich.

Subsequently, the flow proceeds to step S9 and waits until the air-fuel ratio changing process is initiated. Specifically, in the case of post-injection, the ECU 31 waits until post-injection is initiated. In the case of changing an air fuel ratio by secondary air, the ECU 31 waits until the second air valve 25 is in operation.

When the post-injection is initiated (see FIG. 4A) or the secondary air valve 25 is operated, the ECU 31 determines that the air-fuel ratio changing process has been initiated, and then the flow proceeds to step S10. In step S10 and the subsequent steps, a clogging diagnosis for the DPF 18 is made by estimating the increase in exhaust pressure.

First, in step S10, the count time T on a counter timer is subject to (T←T+1) increments, and the response time after the initiation of the air-fuel ratio changing process is measured. The time at which time measurement starts is 0. The process in step S10 functions as a response time calculating means.

Next, the flow proceeds to step S11, where an air-fuel ratio λ detected by the exhaust sensor 20 is read and a determination is made whether the air-fuel ratio λ is less than 1 (i.e., whether the air-fuel ratio λ is weighted on the rich side or not). If the air-fuel ratio λ is lean (λ≧1), the flow returns to step S10, where counting by the counter timer is continued. If the air-fuel ratio λ is weighted on the rich side (λ<1), the flow proceeds to step S12.

In step S12, the air-fuel ratios λ are integrated to calculate an integrated air-fuel ratio Σλ(Σλ←Σλ+λ). Then, the flow proceeds to step S13, where the integrated air-fuel ratio Σλ is compared with a preset integrated air-fuel ratio Σλo used to determine clogging. The air-fuel ratio λ changes with change in exhaust flow rate and the amount of fuel injected, or with the time for which fuel has been cut. Accordingly, determining that the filter is clogged only if the air-fuel ratio λ has reached the clogging determination air-fuel ratio λ1 used to determine clogging may result in inaccurate determination of clogging of the DPF18. To avoid this, as indicated by the alternate long and short dash line in FIG. 4B, air-fuel ratios are integrated when an air-fuel ratio λ is weighted on the rich side; and when this integrated air-fuel ratio Σλ has reached the clogging determination integrated air-fuel ratio Σλo, predetermined by experiments or the like, the integrated air-fuel ratio Σλ is compared with count time (i.e., response time) T measured by the count timer. Accordingly, even where the air-fuel ratio λ does not go beyond the clogging determination air-fuel ratio λ1, a determination whether the DPF 18 is clogged or not is made highly accurately.

If Σλ<Σλo, the flow proceeds to step S14, and if Σλ≧Σλo, the flow jumps to step S15.

In step S14, the air-fuel ratio λ detected by the exhaust sensor 20 is read again and then compared with the clogging determination air-fuel ratio λ1. If λ>λ1, the flow returns to step S10 and count time T is continuously measured. If λ<λ1, the flow proceeds to step S15.

When the flow proceeds to step S15 from step S13 or S14, the count time T of the counter timer is compared with a response time To used to determine clogging. The process in step S15 functions as a clogging determination means.

When the DPF 18 is clogged, exhaust pressure in the exhaust passage 4 and upstream of the DPF 18 increases and the flow rate of the exhaust decreases by an amount corresponding to this increase. As a result, changes in air-fuel ratio detected by the exhaust sensor 20 take place slowly. The clogging determination response time To is the response time when exhaust pressure has reached a level at which the DPF 18 needs to be regenerated. In the first embodiment, when the count time T has reached the clogging determination response time To, it is estimated that exhaust pressure has increased due to the clogging of the DPF 18. The clogging determination response time To obtained by experiments or the like for each engine running area specified by engine speed Ne, an amount Q of intake air, an amount of fuel injected (i.e., engine torque), etc. is stored in advance. The response time To is read each time the count time T is compared with the response time To.

The clogging determination response time To may be learned and corrected taking deterioration of the exhaust sensor 20 into consideration, for example, by measuring a response time (i.e., count time) T taken for an air-fuel ratio λ detected by the exhaust sensor 20 to reach the clogging determination air-fuel ratio λ1 after the recycling of the DPF 18 is finished and then comparing this response time T with the previous response time T measured during the recycling of the DPF. This prevents erroneous determination resulting from deterioration of the exhaust sensor 20.

Exhaust pressure not only changes in proportion to exhaust temperature but is also affected by atmospheric pressure. Accordingly, the clogging determination response time To may be set after corrected based on exhaust temperature TEX detected by the exhaust temperature sensor 19 and atmospheric pressure detected by an atmospheric pressure sensor. Correcting the clogging determination response time To based on exhaust temperature and atmospheric pressure ensures more highly accurate determination of clogging of the DPF 18. Needless to say, in a vehicle that is not equipped with an atmospheric pressure sensor, atmospheric pressure correction must be omitted.

If T≧To, the ECU 31 determines that the DPF 18 is clogged, and then the flow proceeds to step S16, where the ECU 31 sets a clogging determination flag Fpm (Fpm←1), and ends this routine. If T<To, it is determined that the DPF 18 is normal and the flow then branches off to step S17, where the clogging determination flag Fpm is reset (Fpm←0) and the ECU 31 ends this routine.

The clogging determination flag Fpm is read when the DPF is regenerated. If Fpm=0, the DPF is not regenerated. If Fpm=1, the DPF is regenerated. Where the DPF is regenerated by post-injection, a preset amount of fuel for post-injection is forced out from the injector 7 during expansion or exhaust stroke after a compression dead center (ATDC). Consequently, uncombusted HCs are emitted into the exhaust passage 4 from the fuel post-injected through the injector 7. When uncombusted HCs flow into the DOC 17, the temperature of the exhaust gas increases due to heat produced as a result of an oxidizing reaction. The exhaust gas at increased temperature is supplied to the DPF 18, and the DPF 18 is heated such that PM collected in the DPF 18 is burned to regenerate the DPF.

In the first embodiment, clogging of the DPF 18 is determined by estimating exhaust pressure increases from delays in detection of exhaust pressure by the exhaust sensor 20. This obviates the necessity for an exhaust pressure sensor that directly measures exhaust pressure. Accordingly, ordinary sensors used for engine control may suffice to estimate exhaust pressure. This decreases the number of components and prevents an increase in production costs.

Second Embodiment

Figure 5:
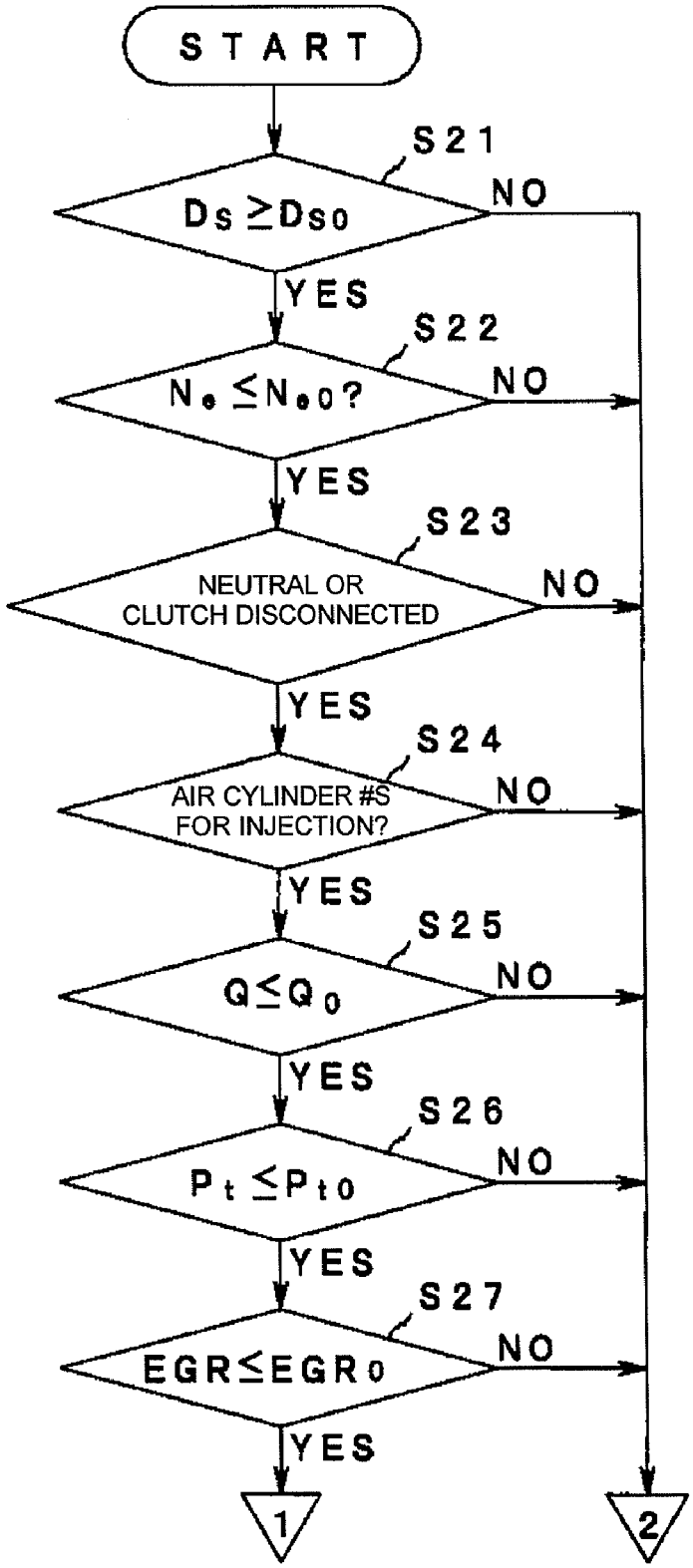
FIG. 5 is the first part of a flowchart illustrating a clogging determination routine according to a second embodiment.
Figure 6:
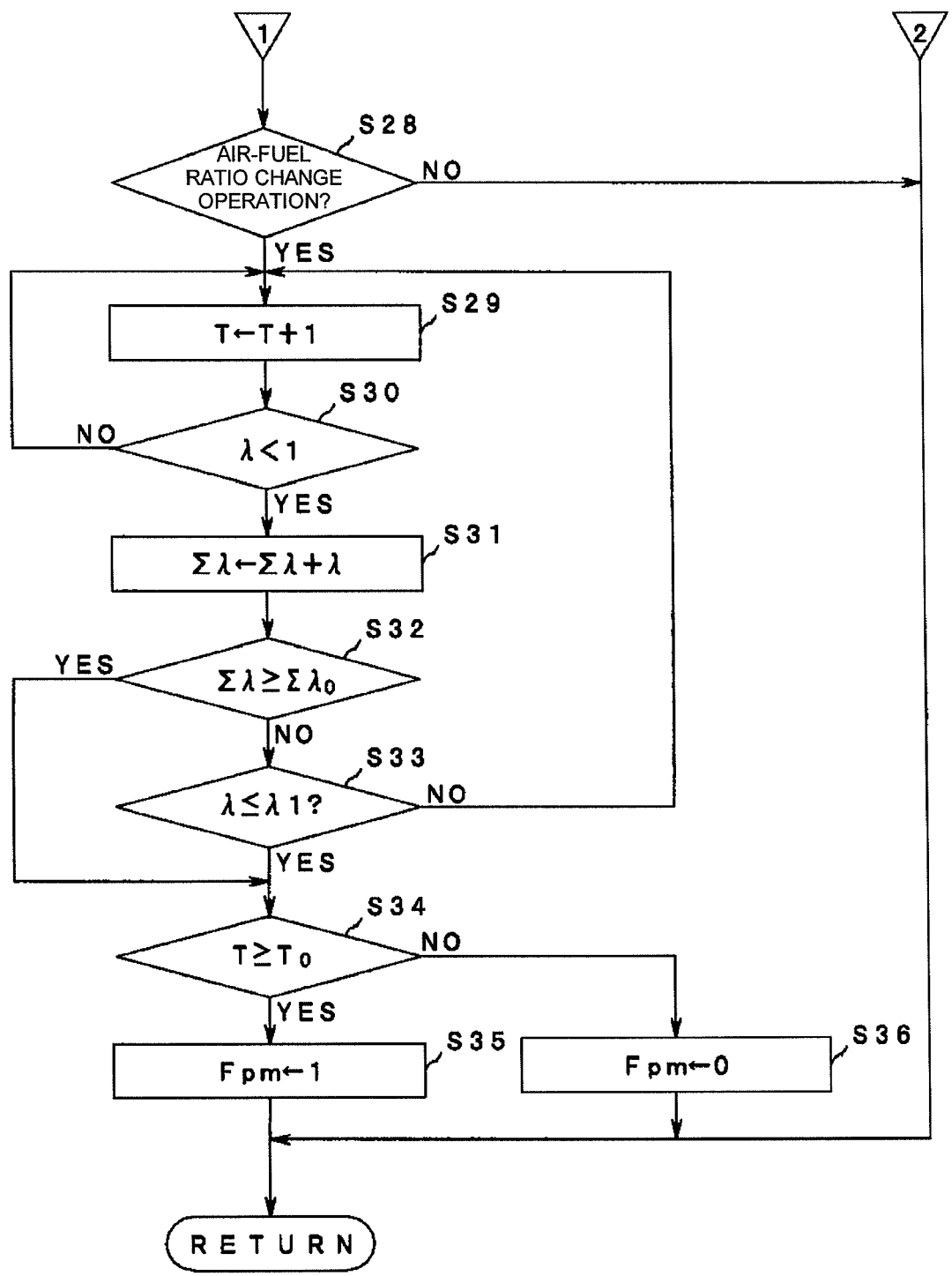
FIG. 6 is the second part of the flowchart illustrating the clogging determination routine according to the second embodiment.

FIGS. 5 and 6 show a clogging determination routine according to a second embodiment of the present invention. In the first embodiment described above, conditions for initiating a clogging diagnosis are determined in steps S1 to S4, and when all the conditions are satisfied, the quantitative control for a stable clogging diagnosis is exerted in steps 5 to 7. In the second embodiment, conditions for initiating a clogging diagnosis are determined in steps S21 to S28 and when all the conditions are satisfied, clogging of the DPF 18 is diagnosed in step S29 and subsequent steps by estimating an exhaust pressure increase, if any.

Figure 2:
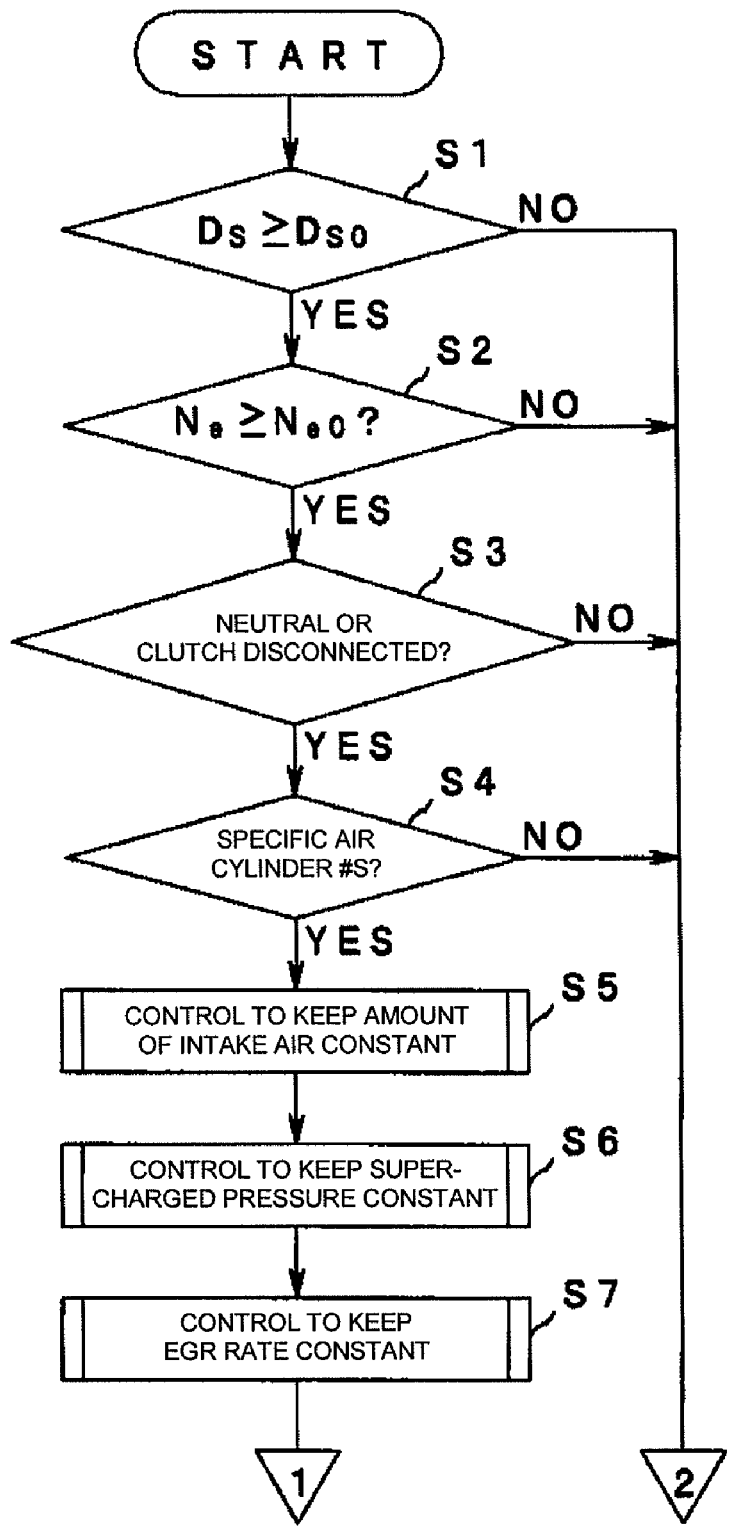
FIG. 2 is the first part of a flowchart illustrating a clogging determination routine according to the first embodiment.
Figure 3:
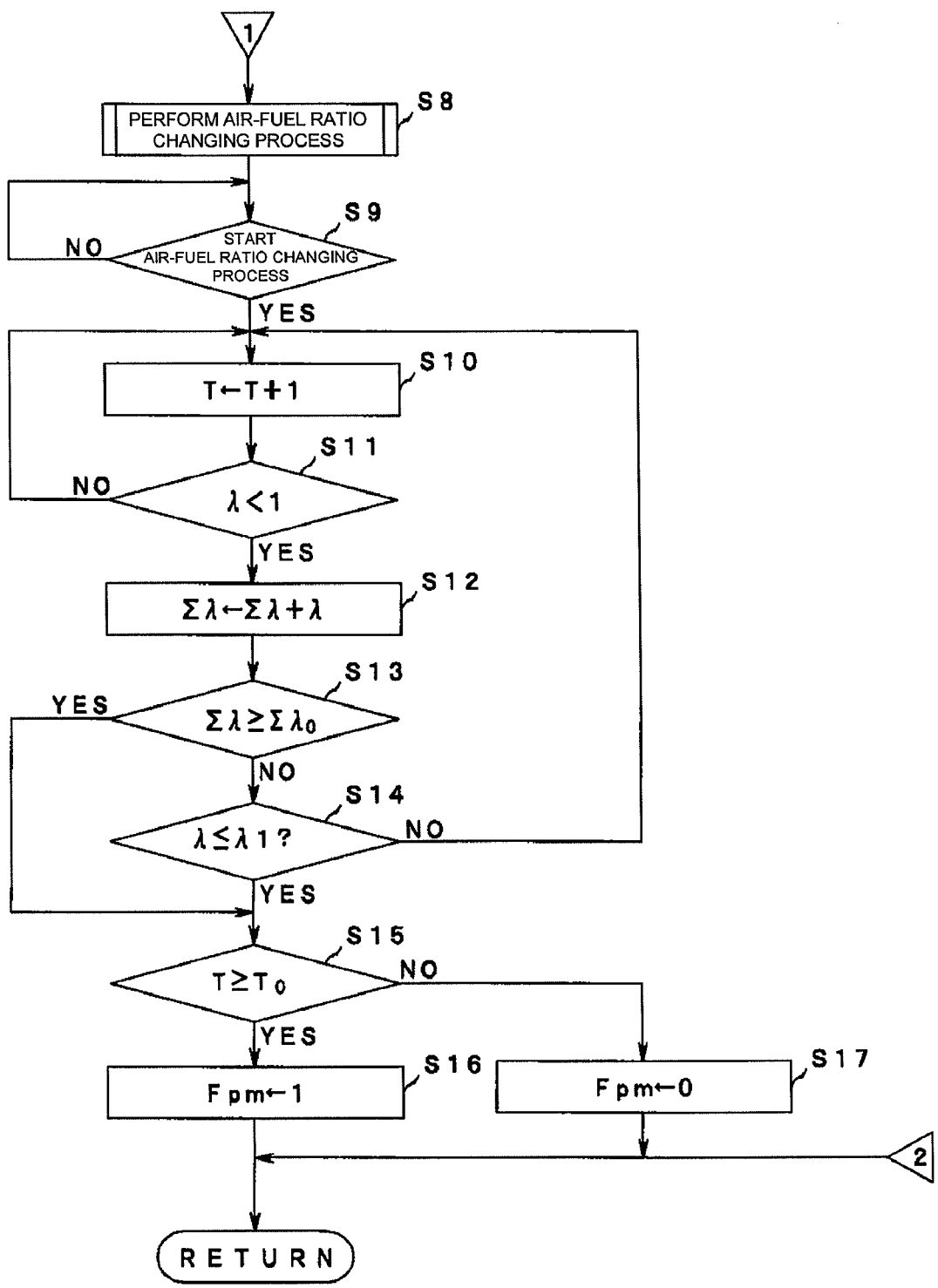
FIG. 3 is the second part of a flowchart illustrating the clogging determination routine according to the first embodiment.
Figure 4:
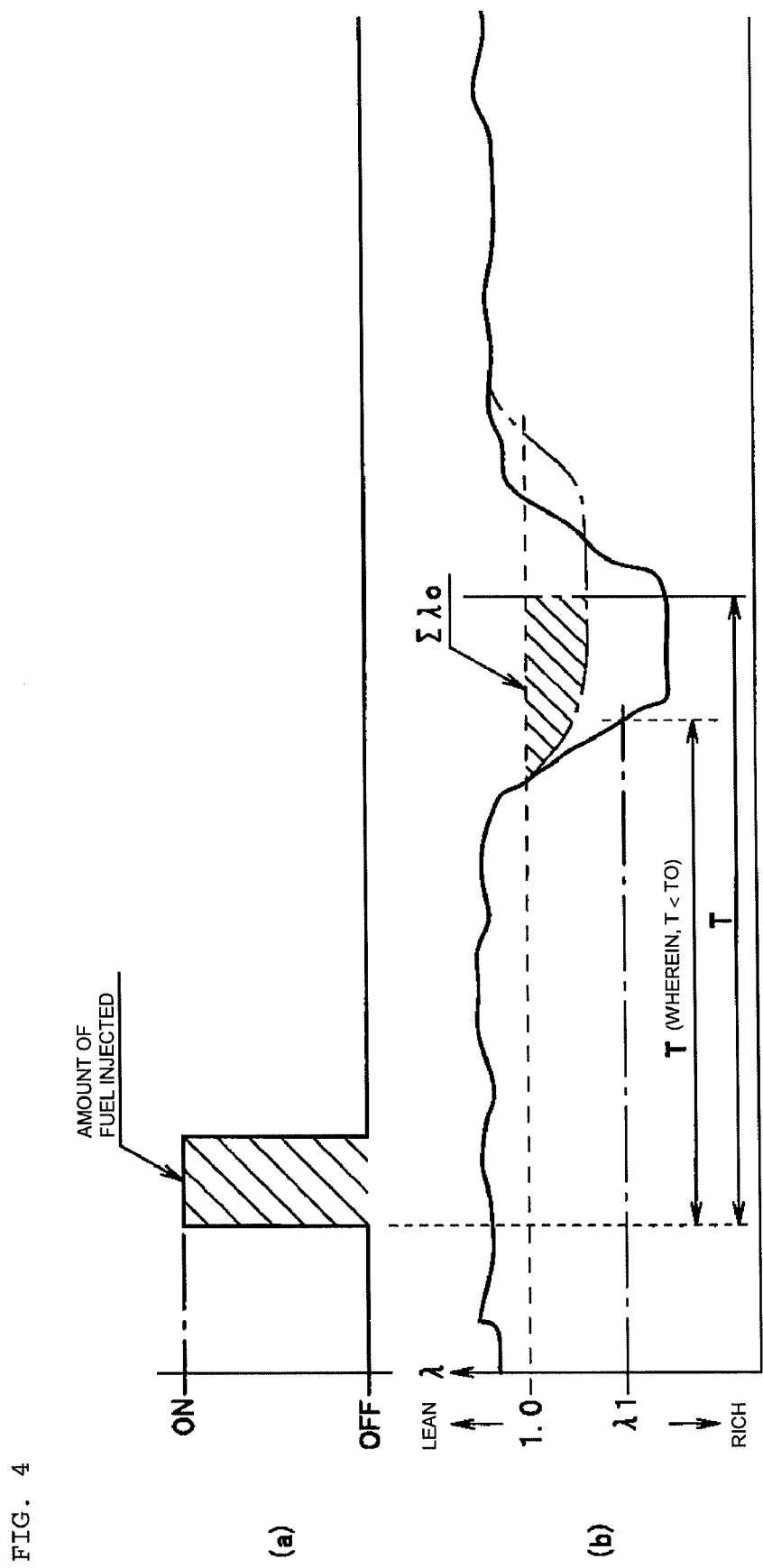
FIG. 4A is a timing chart representing timing for fuel injection.
FIG. 4B is a timing chart representing a change in a fuel ratio after fuel injection is initiated.

Specifically, processes identical to those in steps S1 to S4 shown in FIG. 2 are first performed in steps S21 to S24. In step 21, an integrated value Ds obtained until the current time since the previous regeneration of the DPF 18 is compared with a predetermined integrated value Dso used to determine clogging. If Ds<Dso, clogging has not occurred and the ECU 31 ends the routine. If Ds≧Dso, the DPF 18 is very likely to clog in the near future, and the flow proceeds to step S22, where engine speed Ne measured by the engine speed sensor 27 is compared with the engine speed Neo used to initiate a clogging diagnosis. If Ne>Neo, conditions for initiating the clogging diagnosis are not satisfied, the ECU 31 ends the routine. If Ne≦Neo, the flow proceeds to step S23.

In step S23, based on a signal from a shift position sensor (not shown) that detects a transmission shift position or (in the case of a vehicle with manual transmission) a signal from a clutch switch (not shown), the ECU 31 checks whether the transmission has been set in neutral or not or whether the clutch has been disconnected or not. If the transmission is in neutral or the clutch is disconnected, the flow proceeds to step S24. If the transmission is not in neutral or the clutch is connected, conditions for initiating clotting diagnosis are not satisfied, and the ECU 31 ends the routine.

In step S24, the ECU 31 checks whether the cylinder reaching a compression dead center is a specific cylinder #S selected in advance. If it is not, the ECU 31 ends the routine, but if it is, the flow proceeds to step S25.

In step S25, the ECU 31 checks whether the amount Q of intake air, detected by the intake air amount sensor 13 used as a means for measuring an amount of intake air, is equal to or smaller than a set amount Qo of intake air (i.e., a set value) The smaller an amount of in take air is, the greater the difference between the response time T when the DPF 18 is clogged and that when it is not clogged. Therefore, the set amount Qo of intake air is obtained by experiments or the like conducted so that differences in response time are great. If Q>Qo, any of the conditions for initiating clogging diagnosis is not satisfied, and the ECU 31 ends the routine. If Q≦Qo, the flow proceeds to step S26.

In step S26, a supercharged pressure Pt and a set supercharged pressure Pto are compared. The supercharged pressure Pt is estimated based on an amount Q of intake air. When Pt>Pto, any of the conditions for initiating clogging diagnosis is not satisfied, and the ECU 31 ends the routine. When Pt≦Pto, the flow proceeds to step S27. The lower the supercharged pressure Pt is, the more accurate diagnosis of the DPF 18 becomes. Therefore, the set supercharged pressure Pto is obtained by experiments or the like conducted so that differences in response time are great.

In step S27, an EGR rate (EGR) obtained from, for example, an amount Q of intake air and an engine speed Ne is compared with a set EGR rate (EGRO). If EGR>EGRO, any of the conditions for initiating clogging diagnosis is not satisfied, and the ECU 31 ends the routine. If EGR≦EGRO, the flow proceeds to step S28. The lower the EGR rate (EGR) is, the smaller the change in air-fuel ratio λ is, and hence the more accurately may clogging of the DPF 18 be diagnosed. Therefore, the set EGR rate (EGRO) is obtained by experiments or the like conducted so that differences in response time are great.

In step S28, the ECU 31 checks whether the operation for changing air-fuel ratio has been performed or not. The operation for changing air-fuel ratio refers to the operation for changing the air-fuel ratio at which the counter timer starts measuring count time T. In fuel injection control, examples of the procedure for changing air-fuel ratio include: increasing the amount of fuel to be injected after the degree of opening of the accelerator has changed; and increasing the amount of fuel to be injected due to fuel recovery resulting from a fuel cut involved in deceleration. Cutting fuel is also an example of a procedure for changing air-fuel ratio. Accordingly these procedures are equivalent to the function of an air-fuel ratio changing means.

Where the procedure for changing air-fuel ratio has not been performed, any of the conditions for initiating clogging diagnosis is not satisfied, and the routine ends. Where the procedure for changing air-fuel ratio has been performed, the flow proceeds to step S29. In step S29 and subsequent steps, the clogging of the DPF 18 is diagnosed by estimating exhaust pressure increase, if any. In steps S29 to S36, processes identical to those in steps S10 to S17 shown in FIG. 3 are performed. Therefore, descriptions of the processes in steps S29 to S36 are omitted.

In the second embodiment, clogging of the DPF 18 is diagnosed during a regular operation. Accordingly, in addition to the effects of the first embodiments, the second embodiment yields the following effect: since clogging diagnosis can be made without affecting a regular operation, the diagnosis causes a driver no discomfort.

It is to be understood that the present invention is not limited to the embodiments. For example, conditions for initiating clogging diagnosis may be set by organically combining the first and second embodiments.

What is claimed is:
1. A filter clogging determination apparatus for a diesel engine having a diesel particulate filter in an exhaust system, the apparatus comprising:

an exhaust sensor disposed in the exhaust system and used to detect at least one of the air-fuel ratio and oxygen concentration in exhaust gas;

an air-fuel ratio changing means for changing the air-fuel ratio;

a response time calculating means for calculating the response time taken for the exhaust sensor to detect an air-fuel ratio change after the air-fuel is changed; and a clogging determination means for determining clogging of the diesel particulate filter by comparing the response time and a response time used to determine clogging.

2. The apparatus according to claim 1 wherein the air-fuel ratio changing means changes the air-fuel ratio based on the amount of fuel injected.

3. The apparatus according to claim 1, wherein the air-fuel ratio changing means changes the air fuel ratio by supplying secondary air upstream of the diesel particulate filter.

4. The apparatus according to claim 1, wherein the air-fuel ratio changing means changes the air-fuel ratio by injecting an additional amount of fuel after a main injection of fuel.

5. The apparatus according to claim 1, wherein the air-fuel ratio changing means changes the air-fuel ratio by injecting the amount of fuel required for fuel recovery from a fuel cut.

6. The apparatus according to claim 1, further comprising an intake air amount measuring means for measuring the amount of intake air passing through an intake system, wherein the air-fuel ratio changing means changes the air-fuel ratio based on the amount of intake air measured by the intake air amount measuring means being equal to or smaller than a preset value.

7. The apparatus according to claim 1, further comprising an intake air adjusting means for adjusting the amount of intake air passing through the intake system, wherein the response time calculating means calculates the response time at a time when the amount of intake is kept constant by the intake adjusting means.

8. The apparatus according to claim 1, further comprising a supercharged pressure adjusting means for adjusting supercharged pressure, wherein the response time calculating means calculates the response time at a time when the supercharged pressure is kept constant by the supercharged pressure adjusting means.

9. The apparatus according to claim 1, further comprising an exhaust re-circulating means for adjusting the flow rate of exhaust gas when the exhaust gas is re-circulating to the intake system, wherein the response time calculating means calculates the response time at a time when the rate of exhaust gas re-circulated is kept constant by the exhaust re-circulating means.

10. The apparatus according to claim 1, further comprising an engine speed measuring means for measuring engine speed, wherein the air-fuel ratio changing means changes the air-fuel ratio based on the engine speed measued by the engine speed measuring means being equal to or lower than a preset value.

* * * * *